United States Patent [19]
Idelchik

[11] Patent Number: 4,993,221
[45] Date of Patent: Feb. 19, 1991

[54] GAS TURBINE ENGINE CONTROL SYSTEM

[75] Inventor: Michael S. Idelchik, Swampscott, Mass.

[73] Assignee: General Electric Company, Cincinnati, Ohio

[21] Appl. No.: 287,231

[22] Filed: Dec. 21, 1988

[51] Int. Cl.⁵ .............................................. F02C 9/28
[52] U.S. Cl. ................................. 60/39.03; 60/39.281
[58] Field of Search ............... 60/39.281, 39.282, 243, 60/39.03

[56] References Cited

U.S. PATENT DOCUMENTS

| | | |
|---|---|---|
| 3,114,240 | 12/1963 | Howard et al. |
| 3,152,444 | 10/1964 | Peczkowski et al. |
| 4,188,781 | 2/1980 | Johnson et al. ............... 60/39.281 |
| 4,258,545 | 3/1981 | Slater ............................. 60/226.1 |
| 4,276,744 | 7/1981 | Pisano |
| 4,286,324 | 8/1981 | Ingram ........................... 364/442 |
| 4,313,167 | 1/1982 | Brown ......................... 364/431.02 |
| 4,380,898 | 4/1983 | Cantwell ............................ 60/243 |
| 4,411,595 | 10/1983 | Pisano ................................ 416/1 |
| 4,423,592 | 1/1984 | Evans ........................... 60/39.281 |
| 4,423,593 | 1/1984 | Zagranski et al. ........... 60/39.281 |
| 4,449,360 | 5/1984 | Evans ........................... 60/39.281 |
| 4,507,915 | 4/1985 | Evans ........................... 60/39.281 |
| 4,522,025 | 6/1985 | Greune et al. .................. 60/39.15 |
| 4,522,026 | 6/1985 | Peterson et al. ............. 60/39.281 |
| 4,578,945 | 4/1986 | Peck et al. ................... 60/39.281 |
| 4,593,523 | 6/1986 | Hawes ........................... 60/39.281 |
| 4,625,510 | 12/1986 | Evans ........................... 60/39.161 |
| 4,693,077 | 9/1987 | Skarvan et al. .............. 60/39.282 |
| 4,716,723 | 1/1988 | Ralston et al. ............... 60/39.281 |

OTHER PUBLICATIONS

SAE Journal, Feb., 1949, pp. 26-29 . . . "Control".

Primary Examiner—Donald E. Stout
Attorney, Agent, or Firm—Harley R. Ball; Jerome C. Squillaro

[57] ABSTRACT

A control system and method of controlling a gas turbine engine. The control system receives an error signal and processes the error signal to form a primary fuel control signal. The control system also receives at least one anticipatory demand signal and processes the signal to form an anticipatory fuel control signal. The control system adjusts the value of the anticipatory fuel control signal based on the value of the error signal to form an adjusted anticipatory signal and then the adjusted anticipatory fuel control signal and the primary fuel control signal are combined to form a fuel command signal.

12 Claims, 2 Drawing Sheets 4,993,221

GAS TURBINE ENGINE CONTROL SYSTEM

The invention described herein was made in the performance of work under NASA Contract No. NAS3-22752 and is subject to the provisions of Section 305 of the National Aeronautics and Space Act of 1958 (72 Stat 5; 42 U.S.C. 2457).

The present invention relates to a control system for a gas turbine engine and, more particularly, to a fuel control system for a turboshaft or turboprop engine.

BACKGROUND OF THE INVENTION

In a gas turbine engine designed for use in a helicopter application it is desirable to maintain rotor speed within a stable operating range. For example, if the rotor is attached to a low pressure turbine and if the rotor speed exceeds the stable operating range such that the turbine speed becomes excessive, then destructive conditions may occur. Alternatively, if the rotor speed falls below the stable operating range, then the helicopter will lose lift. Control of the rotor speed becomes difficult when the engine is used in an application, such as a helicopter, in which the operator may be frequently and rapidly changing the load on the engine such as by varying the collective pitch on the rotor. These load changes may result in a deviation from the desired rotor speed, typically termed "droop." Control systems are typically designed primarily for stability, and therefore the system s response to the droop is relatively slow to recuperate to the desired speed. In contrast, other control systems are designed for a relatively quick recuperation, however these systems are characterized as having low stability wherein the output of the system resonates resulting in undesirable torque disturbances. It is therefore desirable to have a control system for a gas turbine engine which provides quick recuperation in rotor speed without excessive instability.

SUMMARY OF THE INVENTION

A control system for a gas turbine engine, comprises a means for receiving an error signal representative of an engine parameter and a means for processing an error signal to form a primary fuel control signal output. The error processing means is coupled to the error signal receiving means and the output of the error processing means is coupled to a means for combining signals. The control system also has a means for receiving and processing demand signals to form an anticipatory fuel control signal output and a means for adjusting the value of the anticipatory fuel control signal based on the value of the error signal. The adjusting means is coupled to the demand signal processing means and the output of the adjusting means is coupled to the combining means The invention also includes a method for controlling a gas turbine engine comprising the steps of receiving an error signal and processing the error signal to form a primary control signal. At least one anticipatory demand signal is also received and processed to form an anticipatory fuel control signal. The anticipatory fuel control signal is adjusted based on the value of the error signal and then the primary fuel control signal and the adjusted anticipatory fuel control signal are combined to obtain a fuel command signal.

DETAILED DESCRIPTION OF PREFERRED EMBODIMENTS

Figure 1:
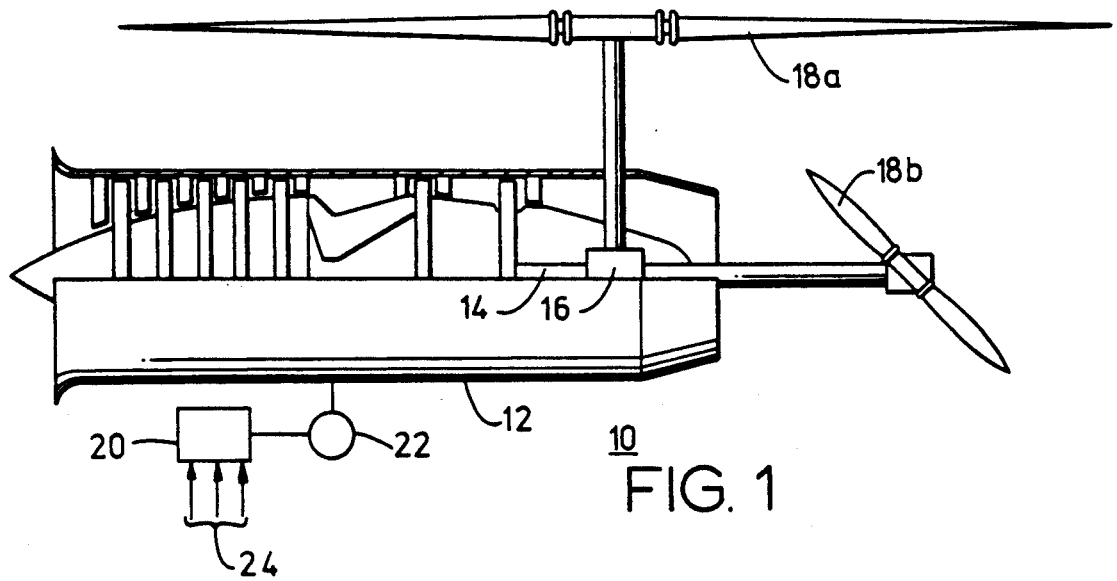
FIG. 1 is a schematic diagram of a gas turbine engine which may employ the present invention.

In FIG. 1, a gas turbine engine system 10 comprises a turboshaft gas turbine engine 12 having an output drive shaft 14. The drive shaft 14 is coupled to gearbox means 16 and the gearbox means 16 is coupled to at least one airfoil 18. In FIG. 1, the gearbox 16 is coupled to first and second airfoils, 18a and 18b, respectively. The first airfoil 18a represents the main airfoil and the second airfoil 18b represents a supplementary airfoil exemplary of helicopter-type systems. A fuel control system 20 controls a fuel control valve 22 which regulates the amount of fuel flow and thereby controls the operation of the output drive shaft 14. The control system 20 receives various inputs 24 representative of operator commands and engine parameters which provide the signals upon which the control system 20 operates.

Figure 2:
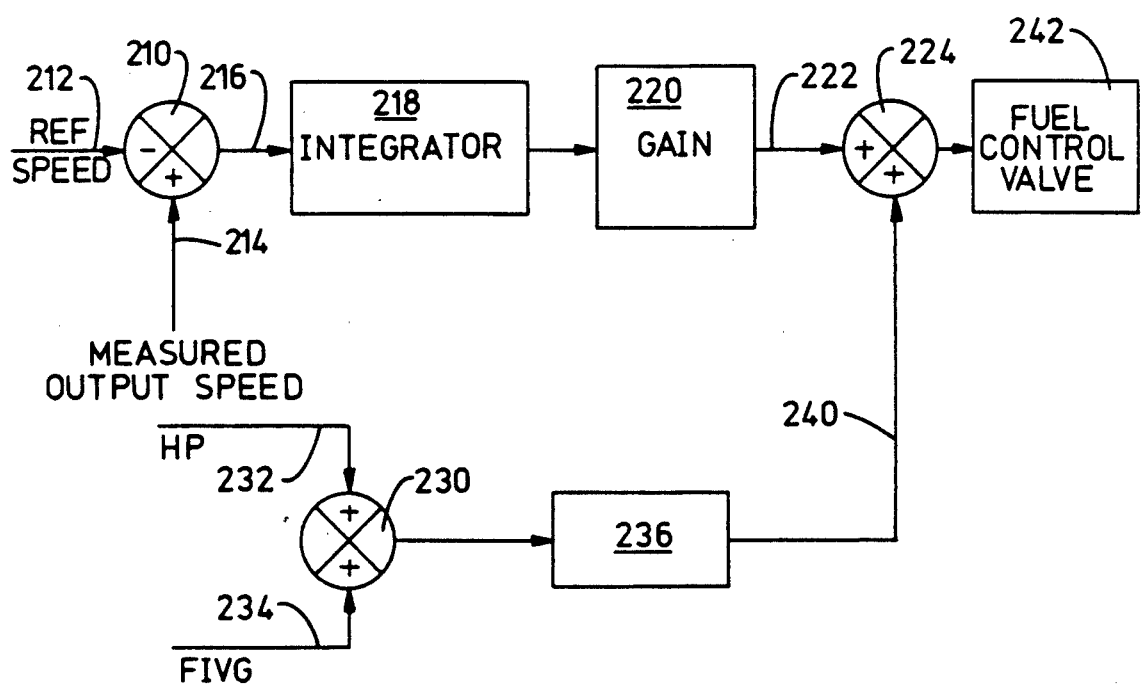
FIG. 2 is a block diagram of a control system

In FIG. 2, a control system without the advantages of the present invention is depicted which includes difference means 210 for receiving an input 212 representative of the desired speed of the output shaft. Difference means 210 also receives an input signal 214 representative of the measured output shaft speed, and produces a speed error signal 216 representative of the difference between the desired and measured speed inputs 212 and 214, respectively. The speed error signal 216 is coupled to an integrator 218 to drive the error to zero over a period of time. The output of the integrator 218 is coupled to gain means 220 which produces a primary fuel control signal 222 which is coupled to a fuel signal summing means 224. A means for summing demand signals 230 receives signals which aid in anticipating the engine's fuel requirements. For example, the demand signal summing means may receive a shaft horsepower demand signal 232 and a fan inlet guide vane (FIVG) demand signal 234. The demand signal summing means 230 is coupled to a processing means 236 which processes the signal and supplies proper gain to form an anticipatory fuel control signal 240 which is coupled to the fuel signal summing means 224. The output of the fuel signal summing means is a fuel command signal which is typically coupled to a fuel actuator, such as a fuel control valve 242 for control of fuel flow to the engine. In operation, the anticipatory demand signals of shaft horsepower demand 232 and FIVG demand 234, after being processed to form the anticipatory fuel control signal, provide the control system with an indication of the engine's need for fuel based on load changes. This system by anticipating fuel requirements reduces speed droop when loads are increased. However, in many engine applications the engine is subjected to rapid and extreme load changes. In these applications it is difficult to provide a system control which quickly responds by anticipating fuel requirements while maintaining engine speed within the stable operating zone. Further, these systems typically become unstable at frequencies indicative of the resonance of the engine system resulting in undesirable torque disturbances. Therefore, it would be desirable to have a control system which rapidly responds to demand changes without subjecting the control system to excessive torque disturbances.

Figure 3:
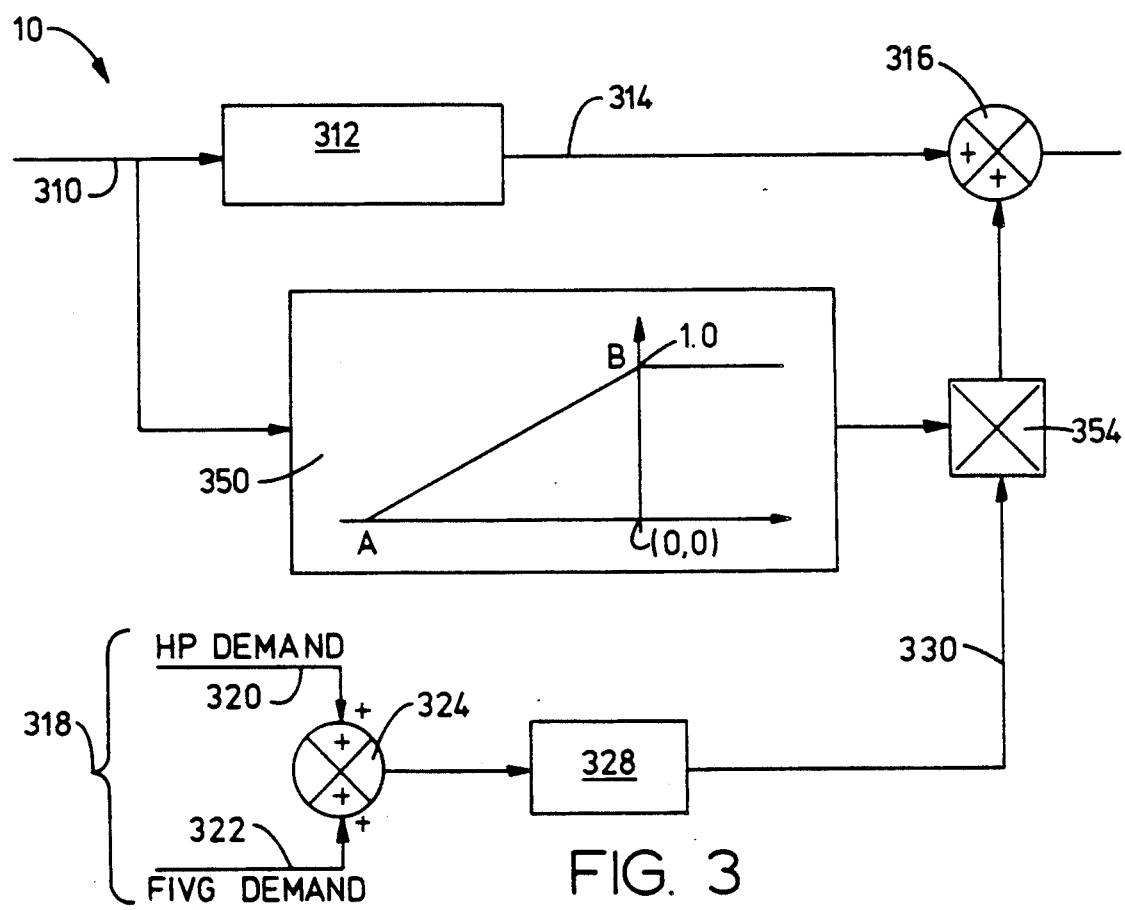
FIG. 3 is a block diagram of one form of control system of the present invention.

In FIG. 3, a control system 300 of the present invention comprises a means for receiving an error signal representative of an engine parameter 310, and a means for processing the signal 312 to form a primary fuel control signal 314 which is coupled to a means for combining signals 316. The control system 300 also has a means for receiving anticipatory demand signals 318, such as a shaft horsepower demand signal 320 and a FIVG demand signal 322. The demand signal receiving means 318 is coupled to an input of a means for summing demand signals 324. The output of the demand signal summing means 324 is coupled to an anticipatory demand signal processing means 328 whose output produces an anticipatory fuel control signal 330. A variable gain element 350 also has a means for receiving the error signal 310 and based on the value of the error signal produces an output for adjusting the value of the anticipatory fuel control signal 330. The output of the variable gain element 350 and the output of the demand signal processing means 328 are coupled to inputs of a multiplication means 354. The output of the multiplication means 354 is coupled to an input of the means for combining fuel signals 316, and the output of the combining means 316 provides the fuel command signal which is typically connected to a fuel actuator.

The means for receiving the error signal 310 may be any means for receiving either an electrical or mechanical signal; however, preferably the receiving means is an input port of a digital electronic control (DEC) system adapted to receive electronic control signals. The error signal is typically a speed error signal. However, other error signals are equally applicable, such as an engine pressure ratio signal. The error signal is generated by techniques well known in the art; typically by utilizing a difference means which receives an input signal representative of the desired speed and subtracts a signal of the measured output speed as obtained through engine sensors. This difference means may also be incorporated into the DEC system. The means for processing the error signal 312 to form the primary fuel control signal 314 is typically an algorithm well known in the art, for example:

$$\frac{k(T_1 s + 1)}{(T_2 s + 1)}$$

wherein k is a multiplier or gain function to adjust the signal to the desired level, s is the complex frequency variable and $T_1$ and $T_2$ are time constants as described by Laplacian algebra, which is used to describe the control systems response to various inputs. The means for receiving the anticipatory demand signals 318 is typically either one or more input ports of the DEC, and the processing means is implemented in the DEC system with standard software techniques which preferably has the following transfer function:

$$\frac{ks}{Ts + 1}$$

wherein k is the gain function, s is the complex frequency variable and T is a time constant. It is to be understood that shaft horsepower demand and FIVG demand are only two possible anticipatory inputs. Other inputs, single or multiple, are contemplated within the present invention. The anticipatory processing means 328, the variable gain element 350, and the multiplication means 354 are preferably implemented by the DEC system through standard techniques. The variable gain element typically has a constant output of either one or zero with a variable function positioned therebetween. For example, as shown in FIG. 3 a ramp function is positioned between an output of zero and one. It is to be understood that numerous other functions may be provided in which the output of the variable gain element 350 provides a different result based on the desired output of the control system. The means for combining the signals 316 preferably comprises a means for either averaging or, more preferably, summing the primary and adjusted anticipatory fuel signals 314 and 330, respectively, and is preferably implemented by electronic techniques through the DEC system. It is to be understood that other combining means, such as dual coil torque motors, are equally applicable to the present invention.

In operation, the error receiving means 310 receives an error signal of a change in engine condition. The processing means 312 then processes the signal using standard techniques to form the primary fuel control signal 314. The means for receiving anticipatory control signals 318 receives the anticipatory demand signals and the signals are combined by the demand signal summing means 324. This output is processed into the anticipatory fuel signal 330 by the anticipatory signal processing means 328. The variable gain element 350 and the multiplication means 354 serve as a means for adjusting the anticipatory fuel control based on the value received by the error signal receiving means 310. As shown in FIG. 3, the variable gain element 350 is typically a nonlinear function which has an unstable operating region which is bounded by two stable operating regions. One stable operating region has a variable gain element output of one, in which case the value of the adjustment to the anticipatory fuel signal is zero. The second stable operating region occurs when the variable gain element's output is zero and therefore the error signal acts as a governor to eliminate all effects of the anticipatory demand signal. For example, in FIG. 3, when the error signal is a speed error and the value of the speed error is greater than that at point B, such as in the case of an underspeed situation, then the output of the gain element is one and the anticipatory fuel control signal has full effect on the fuel control signal to quickly bring the engine speed to the desired range. If the value of the speed error is less than that at point A, such as in an overspeed situation, then the output of the gain element is zero and the anticipatory fuel control signal has no effect on the fuel control signal. Between points A and B, the control system operates in an unstable region and as the speed error indicates that the engine is approaching an underspeed situation, i.e., point B, the greater the value of the output of the gain element and, therefore, the greater the effect of the anticipatory fuel control signal. Additionally, the closer the engine is to an overspeed situation, the lower the output of the gain element and the anticipatory fuel control signal will provide less effect on the fuel command signal. Thus, when attempting to apply an anticipation algorithm for all the possible horsepower and FIVG transients in a given gas turbine engine system application, other systems may be forced to minimize or eliminate the effect of anticipatory fuel control signals. This system provides maximum effect of anticipatory fuel demand signals while providing capability in the control system to ensure that dangerous overspeed or underspeed conditions do not occur in the gas turbine engine.

Although the principles of the invention have been described in relation to the control system 300, it is to be understood that these principles are applicable to other control systems such as those incorporating other functions within the variable gain element and other means for processing both the primary control and anticipatory control signals.

I claim:

1. A control system for a gas turbine engine, comprising:
    means for receiving an error signal representative of an engine parameter;
    means for processing said error signal to form a primary fuel control signal output, said error processing means being coupled to said error signal receiving means and the output of said error processing means being coupled to a means for combining signals;
    means for receiving and processing demand signals to form an anticipatory fuel control signal output; and
    means for adjusting the value of said anticipatory fuel control signal based on the value of said error signal, said adjusting means being coupled to said demand signal processing means and the output of said adjusting means being coupled to said combining means.

2. The control system of claim 1 wherein said error signal is a speed error signal.

3. The control system of claim 1, wherein said gas turbine engine is a turboshaft engine adapted for use in a helicopter application.

4. The control system of claim 1 wherein said means for adjusting said anticipatory fuel control signal further comprises:
    a variable gain element having a means for receiving said error signal and producing an output based on the value of said error signal; and
    a means for multiplying the output of said variable gain element and said demand signal processing means to form an adjusted anticipatory fuel control signal.

5. The control system of claim 4, wherein said variable gain element has an output ranging between zero and one.

6. The control system of claim 5, wherein said variable gain element comprises a ramp function positioned between an output of zero and one.

7. The control system of claim 5, wherein said variable gain element has an output of zero during engine overspeed and an output of one during engine underspeed.

8. The control system of claim 1, wherein said means for adjusting said anticipatory fuel control signal comprises means minimizing the effect of said anticipatory control signal during engine overspeed and maximizing the effect of said anticipatory control signal during engine underspeed.

9. A method for controlling a gas turbine engine comprising the steps of:
    receiving an error signal and processing the error signal to form a primary control signal;
    receiving at least one anticipatory demand signal and processing the signal to form an anticipatory fuel control signal;
    adjusting the value of the anticipatory fuel control signal based on the value of the error signal; and
    combining the primary fuel control signal and the adjusted anticipatory fuel control signal to form a fuel command signal.

10. The method of claim 9 wherein said step of combining said primary and adjusted anticipatory fuel control signals further comprises the step of adding the value of said signals.

11. The method of claim 9 wherein said step of combining said primary and adjusted anticipatory fuel control signals further comprises the step of averaging the value of said signals.

12. The method of claim 9 wherein said step of receiving at least one anticipatory demand signal further comprises receiving a horsepower demand signal and a fan inlet guide vane demand signal.

* * * * *